United States Patent [19]

Torterotot

[11] Patent Number: 5,088,631
[45] Date of Patent: Feb. 18, 1992

[54] DOSER-DISPENSER AND PROCESS FOR DOSING A PASTY AND/OR LIQUID PRODUCT

[75] Inventor: Roland Torterotot, Longvilliers, France

[73] Assignee: ERCA, Les-Ulis Cedex, France

[21] Appl. No.: 644,806

[22] Filed: Jan. 22, 1991

[30] Foreign Application Priority Data

Jan. 23, 1990 [FR] France ............... 90 00758

[51] Int. Cl.⁵ ............................................. B65D 83/14
[52] U.S. Cl. ..................................... 222/389; 222/330; 222/255
[58] Field of Search ............. 222/255, 330, 334, 380, 222/387, 389

[56] References Cited

U.S. PATENT DOCUMENTS

| | | | |
|---|---|---|---|
| 3,127,057 | 3/1964 | Belshaw | 222/330 X |
| 3,930,600 | 1/1976 | Gardner | 222/334 |
| 4,161,262 | 7/1979 | Habrich | 222/380 X |
| 4,502,614 | 3/1985 | Weiler et al. | 222/389 X |
| 4,577,784 | 3/1986 | Brunet | 222/389 X |
| 4,767,031 | 8/1988 | Proepper | 222/330 X |
| 4,872,596 | 10/1989 | Corsette | 222/380 |

FOREIGN PATENT DOCUMENTS

| | | | |
|---|---|---|---|
| 2055751 | 10/1971 | France | 222/334 |
| 2403547 | 5/1979 | France | 222/330 |

*Primary Examiner*—Robert P. Olszewski
*Assistant Examiner*—James R. Bidwell
*Attorney, Agent, or Firm*—Martin Lukacher

[57] ABSTRACT

A doser-dispenser has a single doser unit which is associated with at least two dispenser units. The outlet of the dosing chamber of the doser unit is connected in parallel to each of the dispensing chambers of at least two dispenser units. The active volume of the dosing chamber holds at least two whole doses of product to be dispensed through the two distinct dispenser units. A synchronization device which coordinates the movements of the doser-piston and of the intake flap, with a result that, during delivery of a first dose of product out an dosing chamber, only the ejection valve of the first dispenser unit is open, that, during delivery of the second dose of product, only the ejection valve of the second dispenser unit is open, and so on.

9 Claims, 2 Drawing Sheets

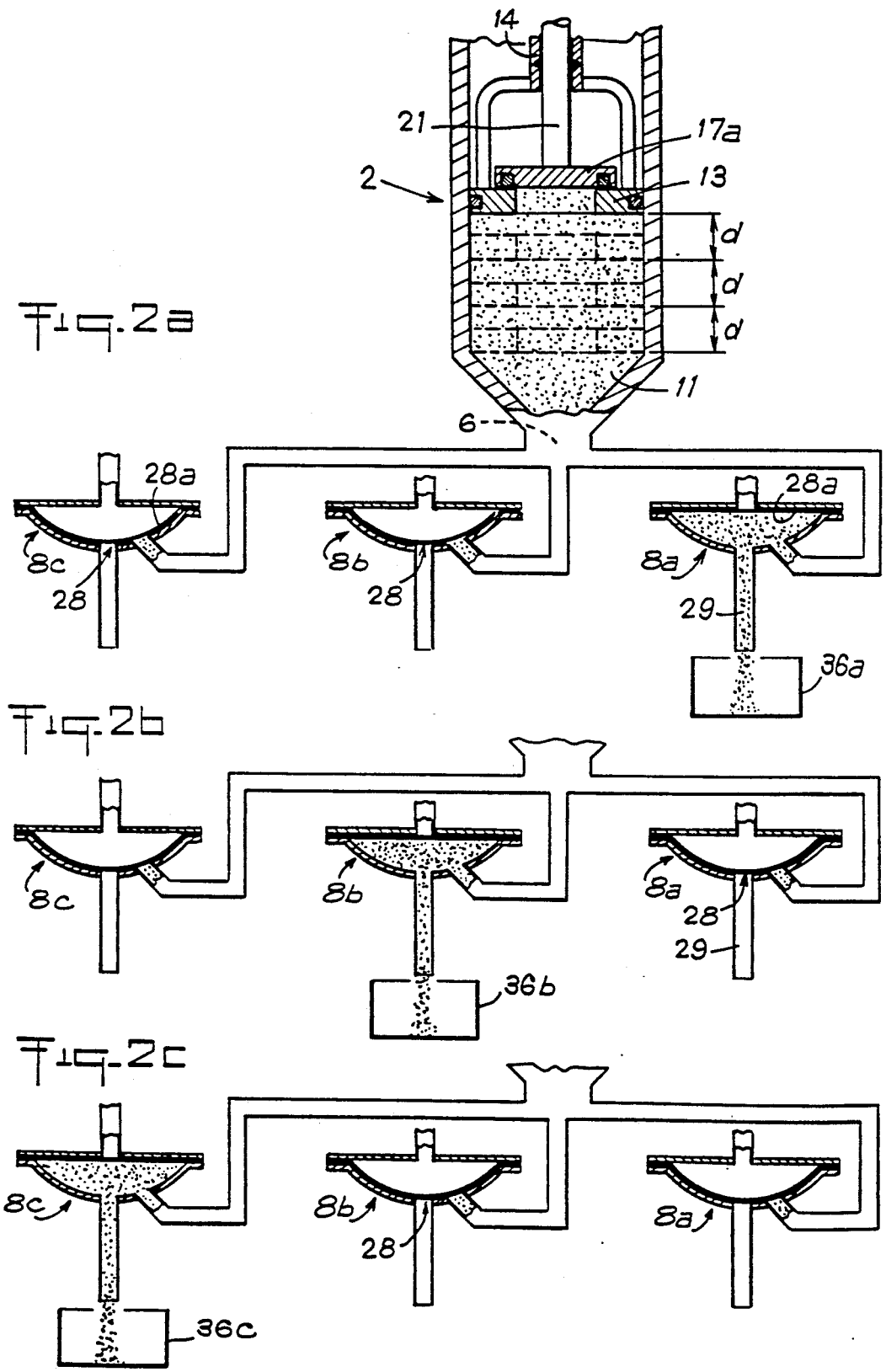

DOSER-DISPENSER AND PROCESS FOR DOSING A PASTY AND/OR LIQUID PRODUCT

FIELD OF THE INVENTION

The present invention relates to a doser-dispenser serving to dispense determined doses of at least one pasty and/or liquid product contained under pressure in at least a first storage reservoir.

BACKGROUND OF THE INVENTION

A doser-dispenser envisaged by the present invention comprises a doser unit in the housing of which are provided, on the one hand, an upper supply chamber connected by a supply conduit to said first reservoir and, on the other hand, a lower dosing chamber separated from said supply chamber by a doser-piston which is fixed to the lower end of a supporting stirrup element fast, at its other end, with the lower end of a first control tube penetrating in tight manner in said first housing. This doser-piston slides in tight manner in the first housing and is provided with a central passage adapted to be obturated by an intake valve of which the obturation member, such as a flap, is borne by the free end of a second control tube or rod projecting in tight manner from the lower end of the first control tube and associated with control means distinct from the device for controlling the first control tube. This second tube is urged by a return spring in the direction of closure of the intake valve, is guided with respect to said doser-piston and cooperates with a valve seat surrounding said central passage of the doser-piston. The doser-dispenser also comprises at least one dispenser unit comprising a dispensing chamber of which the inlet is connected to the outlet of the dosing chamber and of which the outlet is connected to at least one ejection tube, as well as an ejection valve of which the obturation member, such as a flap or membrane, cooperates with the upstream end of each ejection tube, end constituting the seat of said ejection valve and is associated with a control unit.

Such a doser-dispenser is described in French Patent Application FR-A-89 06316 of May 12, 1989.

It has proved to be difficult to dispense with such a doser-dispenser doses of product which are very precise from one dose to the other as soon as each dose represents only a small quantity for which the normal imprecision of the doser-dispenser exceeds 1 to 2% by weight of the predetermined reference dose. This drawback is manifest when the recipients of a row of recipients must be filled simultaneously with doses of product identical from one recipient to the other, with the aid of a doser-dispenser assembly presenting as many doser-dispensers as there are recipients in a row of recipients. Doser-dispensers may, of course, be made whose dosing chambers and doser-pistons all present the same dimensions, but such production involves a prohibitive cost price.

It is an object of the invention to overcome or at least attenuate these drawbacks.

SUMMARY OF THE INVENTION

In a doser-dispenser of the type mentioned hereinabove, this object is attained in that:

a single doser unit is associated with at least two dispenser units, the outlet of the dosing chamber of the single doser unit is connected in parallel to each of the dispensing chambers of at least two dispenser units, the active volume of the dosing chamber of the single doser unit, volume swept regularly by the doser-piston during the suction stroke and the delivery stroke thereof, corresponds to at least two whole doses of product to be dispensed through at least two distinct dispenser units, and in that it comprises a synchronization device which coordinates the movements of the first control tube and of the second control tube of the doser-piston, during the same delivery stroke thereof, with the unit controlling the ejection valve of each of the dispenser units, with the result that, during the delivery of a first dose of product out of the dosing chamber of the single doser unit, only the ejection valve of the first dispenser unit is opened, that, during the delivery of the second dose of product, only the ejection valve of the second dispenser unit is opened, and so on, until all the dispenser units have each delivered a dose of product during the same delivery stroke of the doser-piston of the single doser unit.

Thanks to this design, the detrimental effects of the imprecisions normally tolerated in the manufacture of the doser-dispenser are eliminated or at least attenuated by the precise adjustment of the doses of product with the aid of the ejection valve of each of the dispenser units associated with one and the same doser unit, the time of opening of the ejection valve of one dispenser unit exactly determining the quantity of a dose of product whilst, simultaneously, the ejection valves of the other dispenser units associated with the same doser unit are maintained closed.

The invention also relates to a process for dosing a pasty and/or liquid product with a doser-dispenser of the type described hereinabove and comprising at least one doser unit associated with a dispenser unit.

In this type of doser-dispenser, the quantity or dose of product delivered by the doser-piston towards the corresponding dispenser unit is generally adjusted by adjusting the length of the delivery stroke of said doser-piston of which the control tube is then pushed downwardly more or less soon by a transverse actuation bar also acting on the control tubes of the other juxtaposed doser units. Mechanical adjustment is difficult to effect from one doser unit to the other in an assembly of doser-dispensers associated with a row of recipients, all the more so as such manual adjustment must take into account the whole section of the doser-piston during the adjustment of the length of stroke of said doser-piston.

Another object of the present invention is to eliminate or at least attenuate these drawbacks.

This object is attained in a doser-dispenser of the type mentioned at the beginning, in that, for a given maximum delivery stroke of the doser-piston, maximum stroke corresponding to a delivery volume slightly greater than the largest unitary dose of product to be delivered between two suction strokes of said doser-piston, the quantity of a dose of product delivered by the doser unit towards the dispenser unit whose ejection valve is normally open during the delivery stroke of said doser-piston, is adjusted by opening, at least once during a determined lapse of time, the intake valve of the doser-unit during the delivery stroke of the doser-piston and simultaneously closing the ejection valve of the dispenser unit associated with said doser unit.

The invention also envisages a process for dosing a pasty and/or liquid product, contained under pressure in at least a first storage reservoir, process which makes it possible to use a doser-dispenser of which the mechanical precision, whilst remaining within the usual tolerances, enables doses of product which are very precise from one dose to the other, to be made, particularly when these doses must be delivered virtually simultaneously into the recipients of the same row of recipients.

This process of dosing is carried out with the aid of a doser-dispenser of the type comprising in the cylindrical housing of a doser unit, on the one hand, an upper supply chamber connected by a supply conduit to said first reservoir and, on the other hand, a lower dosing chamber separated from said supply chamber by a doser-piston which is fixed to the lower end of a supporting stirrup element fast, at its other end, with the lower end of a first control tube penetrating in tight manner in said first housing, which slides in tight manner in said first housing, and which is provided with a central passage adapted to be obturated by an intake valve of which the obturation member such as a flap, is borne by the free end of a second control tube or rod projecting in tight manner from the lower end of the first control tube and associated with control means distinct from the control device of the first control tube, this second tube being urged by a return spring in the direction of closure of the intake valve and being guided with respect to said piston and cooperating with a valve seat surrounding said central passage, at least one dispenser unit comprising a dispensing chamber of which the inlet is connected to the outlet of the dosing chamber and of which the outlet is connected to at least one ejection tube, as well as an ejection valve of which the obturation member, such as a flap or membrane, cooperates with the upstream end of each ejection tube, end constituting the seat of said ejection valve and is associated with a control unit. In this doser-dispenser, the single doser unit is associated with at least two dispenser units, the outlet of the dosing chamber is connected in parallel to each of the dispensing chambers of at least two dispenser units, and the active volume of the dosing chamber of the single doser unit, volume swept regularly by the doser-piston during the suction stroke and the delivery stroke thereof, corresponds to at least two whole doses of product to be dispensed through at least two distinct dispenser units.

In such a doser-dispenser, the process of dosing is characterized in that, during the same delivery stroke of the dispenser piston, a first dose of product is delivered through a first dispenser unit, opening the ejection valve of the latter and maintaining closed the ejection valves of the other dispenser units, then a second dose of product is delivered through a second dispenser unit, opening the ejection valve of the latter and closing, or maintaining closed, the ejection valves of the other dispenser units, and so on until the end of the maximum delivery stroke of the doser-piston.

Thanks to this design, several small doses of product may be made virtually simultaneously, and with a very high precision, without the means employed to that end being of prohibitive cost price.

BRIEF DESCRIPTION OF THE DRAWINGS

The invention will be more readily understood on reading the following description with reference to the accompanying drawings, in which:

FIGS. 2a to 2c are schematic views showing several operational positions of a doser-dispenser according to the invention.

DETAILED DESCRIPTION OF THE DRAWINGS

Figure 1:
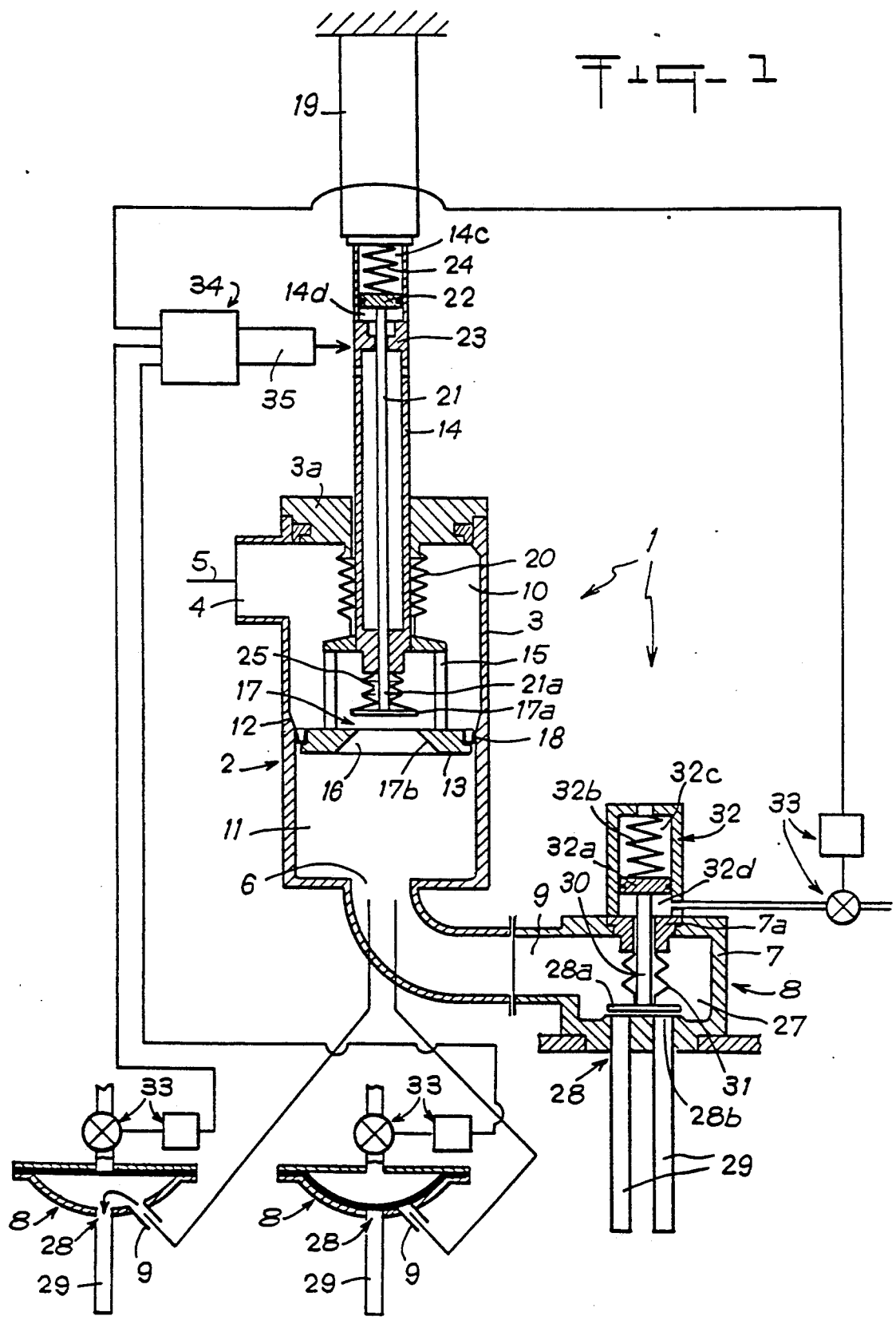
FIG. 1 is a schematic view of a doser-dispenser incorporating two variant embodiments.

Referring now to the drawings, the doser-dispenser 1 comprises a single doser unit 2 of which a housing 3 comprises, in its extreme upper part, a lateral opening 4 permanently connected by a supply conduit 5 to a first storage reservoir (not shown) containing a first pasty and/or liquid product under pressure. The bottom of the housing 3 presents an outlet opening 6 which is permanently connected to the inlet of a second housing 7, the two housings 3 and 7 being, if necessary, sterile.

The first housing 3 forms part of the single doser unit 2 of the doser-dispenser 1 and the second housing 7 forms part of a dispenser unit 8. The doser-dispenser 1 comprises per doser unit 2 at least two dispenser units 8 and, for example, three dispenser units of which the inlets 9 are connected in parallel to the outlet 6 of the doser unit 2. The first housing 3 presents a cylindrical configuration and comprises, from top to bottom, an upper supply chamber 10 permanently connected to the conduit 5 and through the latter to the first storage reservoir, and a lower dosing chamber 11. The lower end of the supply chamber 10 is connected to the upper end of the dosing chamber 11 by a truncated annular contraction 12 narrowing from top to bottom in the direction of the dosing chamber 11. A doser-piston 13 is mounted to move in the dosing chamber 11 and may slide therein in tight manner between a lower, so-called maximum delivery position, and an upper, so-called maximum suction position, in which it is located just below the truncated contraction 12 and separates the supply chamber 10 from the dosing chamber 11. This doser-piston 13 is fixed to the extreme lower part of a first control tube 14 via a stirrup element 15. This doser-piston 13 comprises a central passage 16 adapted to be obturated by the obturation member such as a flap 17a of an intake valve 17. The doser-piston 13 comprises on its periphery an annular 0-ring 18.

The first control tube 14 passes in tight manner through the upper wall 3a of the housing 3 and is guided axially therein during its alternately ascending and descending movements controlled for example by a double-acting jack 19. The upper end of the first control tube 14 is therefore fixed to the piston of the jack 19, for example pneumatic, of which the cylinder is installed to be stationary. It should be noted that the descending movement of the doser-piston 13 may also be controlled by a horizontal transverse bar whose ends are articulated on two eccentrics rotating in synchronous manner, the transverse bar acting on the upper end of the first control tube 14 during the descending movement thereof. Such a drive mechanism ensuring the delivery stroke of the doser-piston 13 is described in French Patent 69 40447 to which reference may be made for greater details. The lower end of the first control tube 14 is obturated in tight manner with respect to the interior of the housing 3. When a drive mechanism as described in French Patent 69 40447 is used to ensure the movement of delivery of the doser-piston 13, the ascending movement is ensured for example by the differential pressure of the product acting on the lower end of the first control tube 14 when the suction valve 17 is open. The first control tube 14 is surrounded, on its section penetrating in the housing 3, by a first bellows 20 whose upper end is fixed in tight manner on the housing wall 3a traversed by said first tube 14 and of which the lower end is fixed in tight manner on the extreme lower part of said first tube 14. A bellows 20 is preferably used, of which the structure is described in French Patent Application No. 89 06316 of May 12, 1989.

The obturation member 17a of the intake valve 17 presents the form of a flap and, with respect to the doser-piston 13, is disposed on the side of the supply chamber 10, the upper edge of the central passage 16 made in the doser-piston 13 constituting the valve seat 17b of said intake valve 17. The central passage 16 of the doser-piston 13 advantageously presents a truncated form which widens from the supply chamber 10 towards the dosing chamber 11. The intake flap 17a of the intake valve 17 is disposed in the housing 3 between the lower end of the first control tube 14 in the vicinity thereof, and the central passage 16 of the doser-piston 13 spaced apart by a determined distance from the lower end of said first tube 14 whilst being fixed thereon. In addition, this intake flap 17a is borne by the closed lower end of a second control tube 21 guided in the first control tube 14 and projecting from the lower end thereof below the circular flange of the stirrup element 15. At its upper end, the second control tube 21 is associated with control means distinct from the control device (for example 19) of the first control tube 14, these control means comprising a piston 22 which slides in tight manner in the extreme upper part of the first control tube 14 and separates the interior of said extreme upper part into an upper chamber 14c and a lower chamber 14d which, at its lower end, is defined by a transverse annular partition 23 fast with the first control tube 14 and guiding in tight manner the extreme upper part of the second control tube 21. The upper chamber 14c is defined at its upper end by the piston of the control jack 19, this piston being fixed in tight manner to the upper end of the first control tube 14. A return spring 24 is disposed in the upper chamber 14c and, by abutting, on the one hand, against the piston of the jack 19 and, on the other hand, against the piston 22 fast with the upper end of the second control tube 21, permanently urges the intake flap 17a against its seat 17b, i.e. in the direction of closure of the intake valve 17. The extreme lower part 21a of the second control tube 21, extreme part 21a projecting from the lower end of the first control tube 14, is surrounded by a second bellows 25 of which the structure is identical or similar to that of the bellows 20 for example of the type described with reference to FIGS. 1 and 2 of French Patent Application No. 89 06316. The upper end of the second bellows 25 is fixed in tight manner on the lower end of the first control tube 14 below the flange of the stirrup element 15 and the first bellows 20, and the lower end of said second bellows 25 is fixed in tight manner either on the lower end of said second control tube 21, or on the intake flap 17a fast with said second tube 21. In this way, the lower end of the first control tube 14 is obturated in tight manner with respect to the interior of the housing 3. The annular space between the extreme lower part of the second control tube 21 and the second bellows 25 is permanently connected to the outside atmosphere, for example with the aid of a plurality of passages made in the form of short slots or circular orifices in the extreme lower part of the second tube 21 and in the section of tube remaining inside the space of the first tube 14 below the transverse annular partition 23, this space being connected to atmosphere through one or more orifices made in the wall of the first tube 14 just below said partition 23. In addition, the upper chamber communicates through a central orifice of the piston 22 with the interior of the second control tube 21 and consequently with the outside atmosphere. The lower chamber of the extreme upper part of the first control tube 14 may be alternately connected to a source of compressed air or to the outside atmosphere through a connecting orifice provided in the wall of said tube 14 just above the transverse partition 23.

Thanks to the particular features which have just been described, the reciprocating movements of the doser-piston 13 are effected without producing noteworthy depressions or overpressures in the dosing chamber, the intake flap 17a automatically acting as exhaust flap if, for one reason or another, the delivery pressure applied to the quantity of the product dosed by the doser-piston 13 exceeds a predetermined value. In addition, as closure of the intake valve 17 is effected by means of the second control tube 21 for example at the end of ascending or suction stroke and before the beginning of the descending or delivery stroke, dosage of the product is effected with a very high precision. Furthermore, supply of the product under a certain pressure ensures complete filling of the dosing chamber 26 with the product without appearance of a noteworthy depression during the ascending stroke of the doser-piston 13 to the open intake valve 17.

The dispenser unit 8 defines in the second housing 7 a dispensing chamber 27 connected to the outlet opening 6 of the dosing chamber 11 and contains an ejection valve 28 of which the obturation member 28a such as a flap or a membrane ensures obturation of the upper end of at least one ejection tube 29. The flap 28a is borne by the lower closed end of a third control tube 30 which is of structure similar to that of the first control tube 14. The section of the third control tube 30, section penetrating in the dispensing chamber 27 or other transfer chamber of the second housing 7, is surrounded by a third bellows 31 of which one end is fixed on the housing wall 7a traversed in tight manner by the third control tube 30 and of which the other end is fixed in tight manner on the obturation member 28a or on the third tube 30 near the obturation member 28a. There again, the structure of this bellows 31 may be similar or identical to that set forth hereinabove. The annular space between the third tube 30 and the bellows 31 is permanently connected to the outside atmosphere in the manner described hereinabove.

The end of the third control tube 30, end opposite the ejection valve 28 and always located outside the dispensing chamber 27 or like housing, bears the control piston 32a of a single-acting jack 32 of which the return spring 32b acts on said piston 32a and thus on the third control tube 30 in the sense of closure of the ejection valve 28 of which the seat 28b is constituted by the upper end of the or each ejection tube 29. The piston 32a separates the volume of the jack 32 into two chambers 32c and 32d of which the one (32c) containing the spring 32b is permanently connected to the atmosphere and of which the other (32d) is capable of being connected alternately either to the outside atmosphere or to a source of compressed air (not shown) via a control unit 33 interposed between, on the one hand, the chamber 32d and, on the other hand, the source of compressed air or the atmosphere.

When at least two dispenser units 8 are used, an active volume is chosen for the dosing chamber 10, i.e. a volume which is swept regularly by the doser-piston 13 during the suction stroke and the delivery stroke thereof, with the result that it corresponds to at least two whole doses of the product to be dispensed virtually simultaneously through said two dispenser units.

The doser-dispenser 1 also comprises a synchronization device 34 which coordinates the movements of the first control tube 14 and of the second control tube 21 of the doser-piston 13, during the same delivery stroke of the latter with the control unit 33 of the ejection valve 28 of each of the dispenser units 8, with the result that, during the delivery of a first dose of product out of the dosing chamber 11 of the single doser unit 2, only the ejection valve 28 of the first dispenser unit 8 is open; that, during delivery of the second dose of product, only the ejection valve 28 of the second dispenser unit 8 is open, and so on, until all the dispenser units 8 have each delivered a dose of product during the same delivery stroke of the doser-piston 13 of the single doser unit 2.

The synchronization device 34 comprises a detector 35 for detecting the delivery stroke of the first control tube 14 of the doser-piston 13, the output of said detector being cyclically connected to each of the control units 33 of the dispenser units 8 in order to control opening of the ejection valves 28 one after the other at the beginning of the delivery of each of the doses of product during the same delivery stroke of the doser-piston 13.

The control device 19 of the first control tube 14 associated with the doser-piston 13, the control means 22, 24 of the intake valve 17 and the control units 33 of the dispenser units 8 are connected to a generator (not shown) of cyclic impulses which triggers off, according to a predetermined program, the delivery and suction strokes of the doser-piston 13, the opening of the intake valve 17 during the suction stroke and, if necessary, during the delivery stroke between the delivery of two successive doses of product, as well as the successive opening of each of the ejection valves 28 during the delivery stroke and during a lapse of time corresponding to the ejection of a predetermined dose of product through a single dispenser unit 8, the ejection valves of the other dispenser units remaining maintained closed.

In a first delivery phase of the doser-piston 13, the ejection valve 28 of the first dispenser unit 8a connected to the outlet of the doser unit 2, valve 28 having a membrane 28a as obturation member, is open and allows the dosed filling of a first recipient 36a during the first part of the delivery stroke of the doser-piston 13, the ejection valves 28 of the other dispenser units 8b and 8c being closed.

In the second delivery phase of the doser-piston 13, the ejection valve 28 of the second dispenser unit 8b is open and allows the dosed filling of a second recipient 36b, the ejection valves 28 of the other dispenser units 8a and 8c being closed and in the third delivery phase of said piston 13, the ejection valve 28 of the third dispenser unit 8c is open and ensures the dosed filling of a third recipient 36c, the ejection valves 28 of the other dispenser units 8a and 8b being closed.

During the ascending stroke of the doser-piston 13, the intake valve 17 is open after having been closed during all the delivery phases, and the ejection valves 28 of all the dispenser units 8a, 8b, 8c are closed. The length d of a partial delivery stroke may be identical to or different from one partial stroke to the other.

With the doser-dispenser according to the invention and for a given maximum delivery stroke of the doser-piston, maximum stroke corresponding to a delivery volume slightly greater than the largest unitary dose of product to be delivered between two suction strokes of said doser-piston, it is advantageous to adjust the quantity of a dose of product delivered by the doser unit 2 towards the dispenser unit 8 of which the ejection valve 28 is normally open during the delivery stroke of said doser-piston 13, opening at least once, during a determined lapse of time, the intake valve 17 of the doser unit 2 during the delivery stroke of the doser-piston 13 and simultaneously closing the ejection valve 28 of the dispenser unit 8 associated with said doser unit 2.

The quantity of product of the different doses of product distributed successively during the same delivery stroke of the doser-piston 13 may also be adjusted by simultaneously adjusting the time of opening of the ejection valve 28 in question and the time of closure of the other ejection valves 28 of the other dispenser units 8b, 8c or 8a, 8c or 8a, 8b, to the time of partial delivery stroke necessary for the doser-piston 13 to deliver the quantity of product corresponding to a predetermined dose of product.

In certain cases, it may be opportune if doses of product different from one dose to the other are dispensed during the same delivery stroke of the doser-piston 13.

According to a variant of the process, it is proposed that, during the delivery stroke of the doser-piston 13, the intake valve 17 thereof be opened for a short lapse of time and, simultaneously, that the ejection valves 28 of all the dispenser units 8, 8a, 8b, 8c be closed or maintained closed.

According to another variant of the process, it may be advantageous if, during the delivery stroke of the doser-piston 13 with intake valve 17 open, the ejection valve 28 of one of the dispenser units 8, 8a, 8b, 8c is opened and if the intake valve 17 is simultaneously and progressively closed.

What is claimed is:

1. In a doser-dispenser having a first doser unit which includes a cylindrical housing having a first storage reservoir and serving to dispense determined doses of at least one flowable product contained under pressure in said first storage reservoir, the improvement comprising in the cylindrical housing an upper supply chamber, a supply conduit connecting said supply chamber to said first reservoir, a doser-piston, a lower dosing chamber separated from said supply changer by said doser-piston and having an active volume swept by said doser piston during suction and delivery strokes thereof, a first control tube, a supporting stirrup element having opposite ends and connected fixedly to said doser piston at one of its opposite ends and at the other of its opposite ends with the lower end of said first control tube, said first control tube penetrating said housing and being in liquid tight and sliding relationship therewith, said first control tube having opposite ends, a control device coupled to said first control tube in tight manner in said housing, and said housing having a central passage obturated by an intake valve having an obturation member provided by a flap, a seat for said intake valve surrounding said central passage, a second control member projecting in tight relationship from one of said opposite ends of the first control tube, control means distinct from the device for controlling the first control tube, a return spring, said obturation member being urged by said return spring in the direction of closure of the intake valve, and being guided with respect to said doser-piston and cooperating with said valve seat surrounding said central passage, a first dispenser unit comprising an ejection tube having an upstream end, an ejection valve, a dispensing chamber having an inlet connected to the outlet of the dosing chamber of said doser unit and having an outlet connected to said ejection tube said ejection valve having an obturation member, a flap or membrane providing said ejection valve's obturation member, said obturation member of said ejection valve being disposed in cooperating relationship with the upstream end of said ejection tube, said upstream end providing a seat of said ejection valve, a control unit for said ejection valve, a second dispenser unit having all of the components of said first dispenser unit, said doser unit being associated with said first and a second dispenser unit in that the outlet of the supply chamber of said doser unit is connected in parallel to each of the dispensing chambers of said first and second dispenser units, the active volume of the dosing chamber of the doser unit being swept regularly by the doser-piston during the suction stroke and the delivery stroke thereof, corresponding to at least two whole doses of product to be dispensed through said two dispenser units, and further comprising synchronization means for coordinating the movements of said first control tube and of said second control tube during the same delivery stroke thereof and for controlling the ejection valve of each of the first and second dispenser units, whereby during the delivery of a first dose of product out of the dosing chamber of said doser unit, only the ejection valve of the first dispenser unit is opened, that, during the delivery of the second dose of product, only the ejection valve of the second dispenser unit is opened, and so on, until all the dispenser units have each delivered a dose of product during the same delivery stroke of the doser-piston of the doser unit.

2. The doser-dispenser of claim 1, wherein the synchronization device comprises a detector for detecting the delivery stroke of the first control tube of the doser-piston, the output of said detector being cyclically connected to each of the control units of the dispenser units in order to control opening of the ejection valves one after the other at the beginning of delivery of each of the doses of product during the same delivery stroke of the doser-piston.

3. The doser-dispenser of claim 1, wherein the control device of the first control tube associated with the doser-piston, the control means of the intake valve and the control units of the dispenser units are connected to a cyclic impulse generator which triggers off, according to a predetermined program, the delivery and suction strokes of the doser-piston, the opening of the intake valve during the suction stroke and, if necessary, during the delivery stroke between the delivery of two successive doses of product, as well as the successive opening of each of the ejection valves during the delivery stroke and a lapse of time corresponding to the ejection of a predetermined dose of product.

4. Process for dosing a flowable product contained under pressure in at least a first storage reservoir, with the aid of a doser-dispenser of the type comprising in the cylindrical housing of a doser unit, on the one hand, an upper supply chamber connected by a supply conduit to said first reservoir and, on the other hand, a lower dosing chamber separated from said supply chamber by a doser-piston which is fixed to the lower end of a supporting stirrup element fast, at its other end, with the lower end of a first control tube penetrating in tight manner in said housing, which slides in tight manner in said housing, and which is provided with a central passage adapted to be obturated by an intake valve of which the obturation member, such as a flap, is borne by the free end of a second control tube or rod projecting in tight manner from the lower end of the first control tube and associated with control means distinct from the device for controlling the first control tube, this obturation member being urged by a return spring in the direction of closure of the intake valve, and being guided with respect to said doser-piston and cooperating with a valve seat surrounding said central passage, at least one dispenser unit comprising a dispensing chamber of which the inlet is connected to the outlet of the dosing chamber of which the outlet is connected to at least one ejection tube, as well as an ejection valve of which the obturation member, such as a flap or membrane, cooperates with the upstream end of each ejection tube, said upstream end constituting the seat of said ejection valve and is associated with a control unit, comprising the steps of driving said doser piston over given maximum delivery stroke of the doser-piston, maximum stroke corresponding to a delivery volume slightly larger than the largest unitary dose of product to be delivered between two suction strokes of said doser-piston to deliver a quantity of a dose of product from the doser unit towards the dispenser unit whose ejection valve is normally open during a delivery stroke of said doser-piston, adjusting said ejection valve b y opening at least once, during a determined lapse of time, the intake valve of the doser unit during the delivery stroke of the doser-piston and simultaneously closing the ejection valve of the dispenser unit.

5. Process for dosing a pastry and/or liquid product contained under pressure in at least one storage reservoir, with the aid of a doser-dispenser of the type comprising in the cylindrical housing of a doser unit, on the one hand, an upper supply chamber connected by a supply conduit to said reservoir, and, on the other hand, a lower dosing chamber separated from said supply chamber by a doser-piston which is fixed to the lower end of a supporting stirrup element, at its other end, with the lower end of a first control tube penetrating in tight manner in said housing, which slides in tight manner in said first housing, and which is provided with a central passage adapted to be obturated by an intake valve of which the obturation member, such as a flap, is borne by the free end of a second control tube or rod projecting in tight manner from the lower end of the first control tube and associated with control means distinct from the control device of the first control tube, this obturation member being urged by a return spring in the direction of closure of the intake valve and being guided with respect to said piston and cooperating with a valve seat surrounding said central passage, at least one dispenser unit comprising a dispensing chamber of which the inlet is connected to the outlet of the dosing chamber and of which the outlet is connected to at least one ejection tube, as well as an ejection valve of which the obturation member, such as a flap or membrane, cooperates with the upstream end of each ejection tube, said upstream end constituting the seat of said ejection valve and is associated with a control unit, doser-dispenser in which the single doser unit is associated with at least two dispenser units, the outlet of the dosing chamber is connected in parallel to each of the dispensing chambers of at least two dispenser units, and the active volume of the dosing chamber of the single doser unit, volume regularly swept by the doser-piston during the suction stroke and the delivery stroke thereof, corresponds to at least two whole doses of product to be dispensed through at least two distinct dispenser units, comprising the steps of, during the same delivery stroke of the doser-piston, delivering a first dose of product through the first dispenser unit by opening the ejection valve of the latter and maintaining closed the ejection valves of the other dispenser unit, then delivering a second dose of product through the second dispenser unit by opening the ejection valve of the latter and closing or maintaining closed the ejection valves of the other dispenser unit, and so on until the end of the maximum delivery stroke of the doser-piston.

6. The process of dosing according to claim 5, further comprising the step of adjusting the quantity of product of the different doses of product dispensed successively during the same delivery stroke of the doser-piston by simultaneously adjusting the time of opening of at least one of the ejection valves and the time of closure of the other ejection valves in accordance with the time of occurrence of a part of the delivery stroke necessary for the doser-piston to deliver the quantity of product corresponding to a predetermined dose of product.

7. The process of dosing according to claim 5, wherein said adjusting step is carried out such that doses of product different from one dose to the other are dispensed during the same delivery stroke of the doser-piston.

8. The process of dosing according to claim 5 comprising during the delivery stroke of the doser-piston, opening the intake valve for a short lapse of time and, simultaneously, closing or maintaining closed the ejection valves of all the dispenser units.

9. The process of dosing according to claim 8, comprising during the delivery stroke of the doser-piston with intake valve open, opening the ejection valve of one of the dispenser units and closing the intake valve of the other of the dispenser units simultaneously and progressively.

* * * * *